Figure 1:
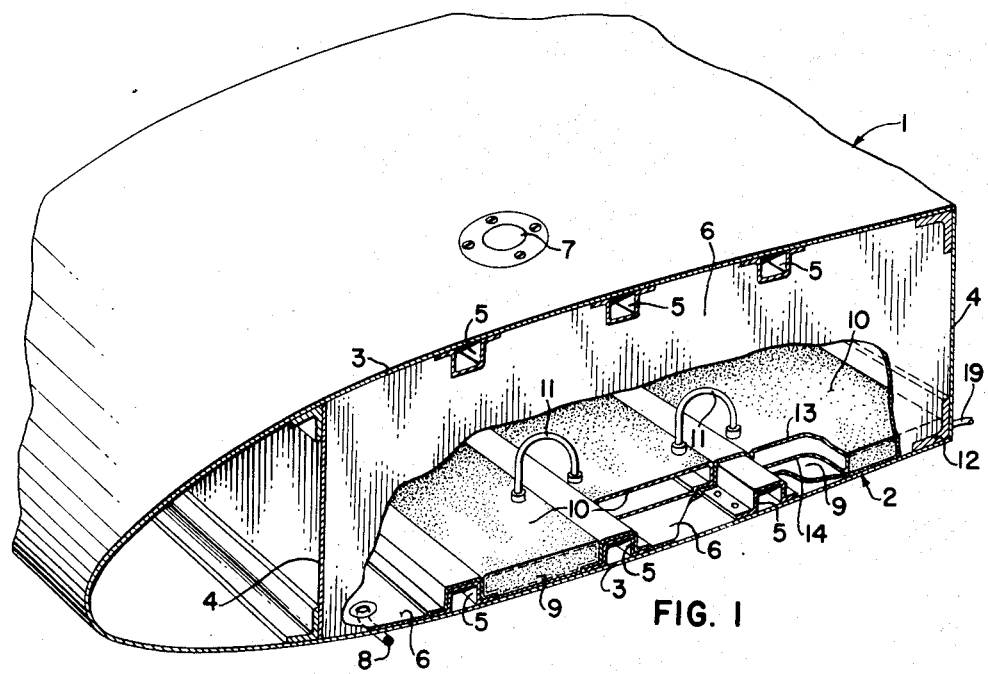

Nov. 3, 1953          J. A. MERRILL          2,657,884
                        FUEL CELL
Filed Nov. 9, 1950                    2 Sheets-Sheet 1

INVENTOR.
JAMES A. MERRILL
BY
*R. L. Miller*
ATTORNEY

Nov. 3, 1953　　　　J. A. MERRILL　　　　2,657,884
FUEL CELL

Filed Nov. 9, 1950　　　　　　　　　　2 Sheets-Sheet 2

*INVENTOR.*
JAMES A. MERRILL
BY
*R. L. Miller*
ATTORNEY

UNITED STATES PATENT OFFICE 2,657,884

FUEL CELL

James A. Merrill, Akron, Ohio, assignor to Wingfoot Corporation, Akron, Ohio, a corporation of Delaware Application November 9, 1950, Serial No. 194,871

10 Claims. (Cl. 244—135)

The present invention relates to an improved form of bladder-type tank or cell for the storage of liquid fuel for use in aircraft and the like. More particularly, the present invention is concerned with a form of flexible fuel cell in which is disposed means for preventing the pocketing of the fuel in depressions or pockets formed in the walls of the cell by obstructions in the fuel chamber or compartment in which the cell is housed.

The fuel chamber in an aircraft has a large number of reinforcing elements or stiffeners which project inwardly into the chamber from the innermost surfaces of the skin or shell and the bulkheads of the aircraft. Heretofore, when a flexible fuel cell was employed, it was necessary to provide a bearing plate or other suitable means spanning the several stiffeners for supporting the bottom wall of the cell. This resulted in a substantial reduction in the size of the cell as well as in its fuel capacity. However, if the fuel cell is designed exactly to fit over and around the several stiffeners in the fuel chamber, a greater fuel capacity results, but some of the fuel supply becomes entrapped in the depressions or pockets formed in the bottom wall of the cell by the stiffeners.

This trapped fuel constitutes an appreciable dead load which could be used in the event of an emergency, but unless some means is employed to facilitate the drainage of these pockets, this extra capacity cannot be utilized. One means for accomplishing substantially complete drainage of such fuel cells is disclosed in the Noyes Patent 2,519,393. The patentee employs various forms of mechanical devices for actually raising the bottom wall of the fuel cell above the stiffeners to enable the fuel to flow out of the pockets and to drain toward the outlet.

While the Noyes invention operates satisfactorily to insure substantially complete drainage of the fuel cell under ordinary conditions, it has been found to be unsatisfactory for use in those instances when the aircraft is subjected to extremely low temperatures. With the rapid developments in aviation which have greatly extended the range of aircraft into arctic and extremely high altitude operations, the factor of cold sensitivity is becoming much more important in the design of the aircraft and all of its accessories.

The flexible walls of the bladder-type tank or fuel cell are formed from a fabric-reinforced sheet material such, for example, as a superpolyamide of the type known as nylon which has a distinct tendency to lose its flexibility and become stiff upon being exposed to low temperatures. As a result of this characteristic of the material from which the fuel cells are constructed, it is desirable to maintain the flexible walls in as nearly a static condition as possible in order to avoid rupture. Even at normal temperatures, excessive flexing of the walls tends to shorten the life of the cell. Thus, it is preferable to avoid any flexing whatsoever of the walls of the fuel cell if damage and eventual leakage of the cell is to be prevented.

The present invention overcomes this problem by positioning the means for accomplishing the substantially complete drainage of the depressions or pockets formed in the wall of the cell internally of the fuel cell proper. The invention contemplates the use of an inflatable member or diaphragm adhesively secured to the inner surface of the bottom wall of the fuel cell in each of the depressions or pockets formed therein. These inflatable members or diaphragms are adapted to be inflated substantially simultaneously, whereby any of the liquid trapped in the depression or pocket in the fuel cell will be displaced and directed toward the outlet.

It is an object of the present invention to provide a means for insuring substantially complete drainage of the liquid trapped in the depressions or pockets formed in the bottom wall of a flexible bladder-type tank or fuel cell.

It is another object of the present invention to provide a means of preventing such fuel entrapment without in any way affecting the flexible walls of the cell itself and permitting them to remain in completely static condition throughout the operation of draining the liquid therefrom.

Other objects and advantages of the present invention will become apparent as the description of the accompanying drawings illustrating two embodiments of the invention proceeds.

Figure 2:
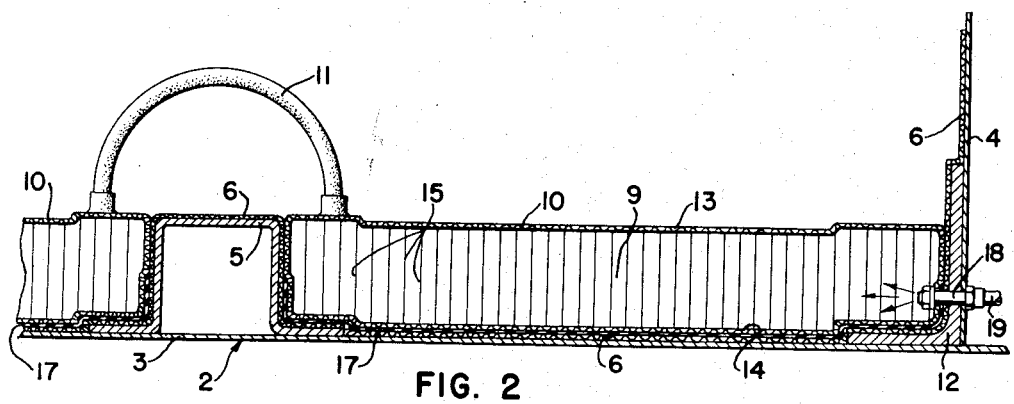
Figure 3:
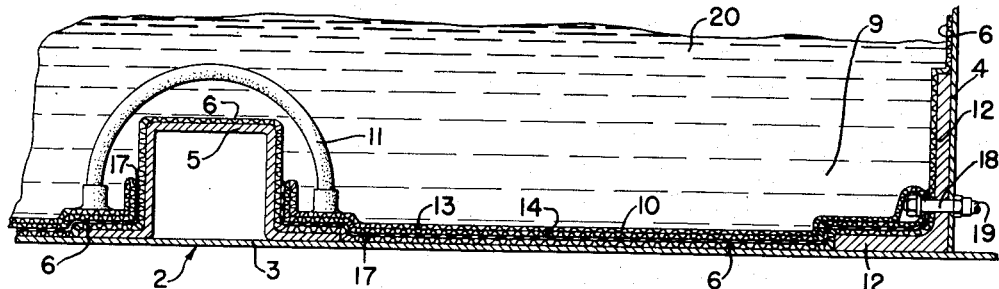
Figure 4:
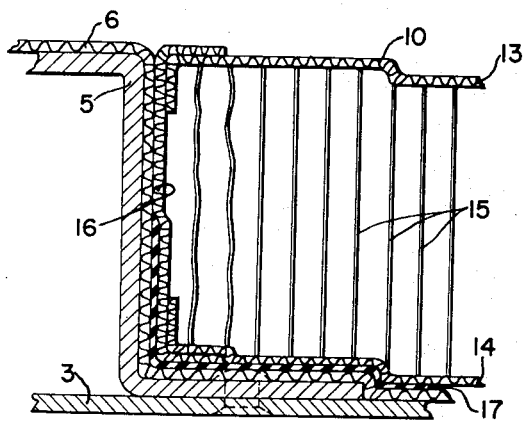
Figure 7:
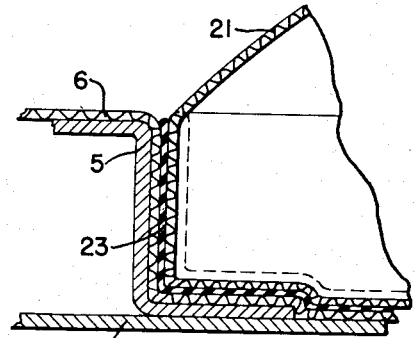
Figure 5:
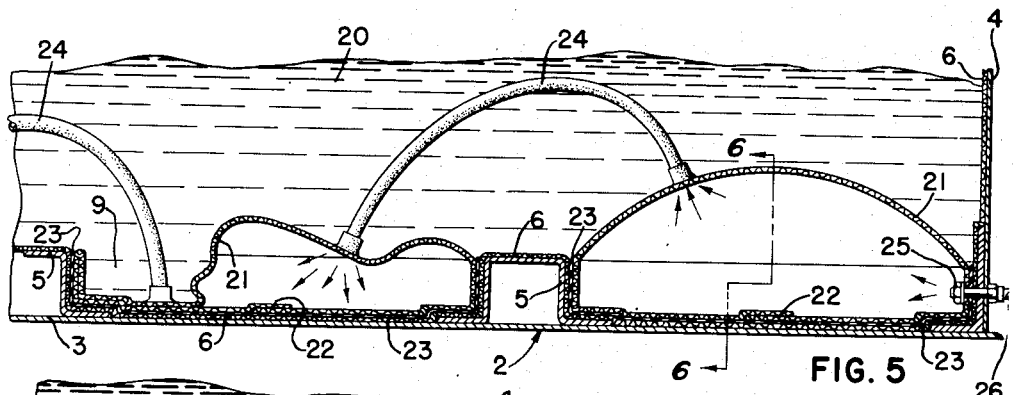
Figure 6:
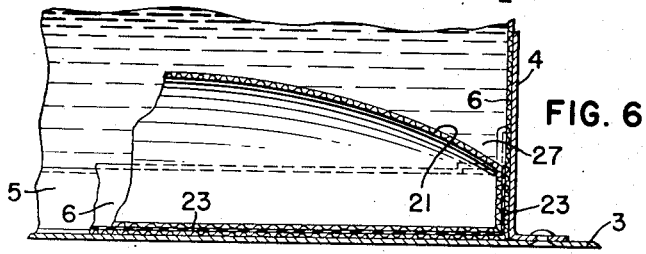

Fig. 1 is a fragmentary isometric view, with parts in section and broken away, illustrating the application to a flexible fuel cell of one form of structure embodying the principles of the present invention. Fig. 2 is a fragmentary cross section of the bottom wall of the fuel cell of the present invention at an enlarged scale illustrating the inflatable means expanded. Fig. 3 corresponds generally to Fig. 2 with the exception that the inflatable means is shown deflated. Fig. 4 is a fragmentary vertical section of the fuel cell of Fig. 3 illustrating in detail the construction of the inflatable means at an enlarged scale. Fig. 5 corresponds generally to Fig. 2 and illustrates another modification of the invention. Fig. 6 is a vertical cross section taken along the line 6—6 in Fig. 5. Fig. 7 is a fragmentary vertical section taken from Fig. 5 and corresponding generally to Fig. 4.

In Fig. 1 of the drawings, the reference numeral 1 refers generally to the wing structure of an aircraft. The wing structure 1 houses a metal tank or fuel chamber 2 made up of the outer shell or skin 3 of the wing structure and a plurality of enclosure walls or bulkheads 4. It should be noted that the outermost enclosure wall 4 of the fuel chamber 2 has been removed in Fig. 1 in order to avoid confusion and to illustrate the manner in which the invention is applied.

In the wing structure 1, there are a plurality of reinforcing elements or stiffener members 5 which are shown as being disposed both in the upper and the lower portions of the skin 3 and projecting inwardly into the fuel chamber 2. A bladder-type tank or fuel cell 6 is inserted in the fuel chamber 2 and, by reason of its irregular wall construction, it is adapted to fit closely over and around the several stiffener members 5 so as to make available every bit of space in the wing structure 1 for the storage of liquid fuel. A suitable fill opening 7 is provided in the outer shell 3 and an outlet 8 is connected to the base of the fuel cell 6 in such a way as to be concealed in the fairing (not shown) which connects the wing structure with the fuselage of the aircraft.

As a result of the fact that the fuel cell is closely fitted into the fuel chamber 2, the inwardly projecting stiffener members 5 create sizable depressions or pockets 9 in the walls of the cell defined by the several stiffener members and the enclosure walls 4. It is in these depressions or pockets 9 formed in the bottom wall that the liquid fuel is trapped when the level of the body of the fuel supply in the fuel cell 6 reaches the tops of the stiffener members 5, thereby preventing this rather substantial quantity of fuel from reaching the outlet 8. It is this entrapment of fuel in the depressions or pockets which the structure of the present invention is intended to prevent by the disposition therein of the inflatable members or diaphragms 10.

A single diaphragm 10 is disposed in each of the pockets 9 with the exception of that to which the outlet 8 is connected as will be apparent from Fig. 1 of the drawings. The several diaphragms 10 are fitted with interconnecting means or connector tubes 11 which are made of hose or flexible tubing of sufficient length to insure that they will clear the uppermost surface of the stiffener members 5 when the diaphragms are deflated. These connector tubes 11 serve to facilitate the substantially simultaneous inflation of the several diaphragms 10. The diaphragms 10, by virtue of their flexible construction, will conform closely to the angle members 12 as well as to the stiffener members 5 as will best be seen from Fig. 2 of the drawings.

Each diaphragm 10 may take any of several different forms, one of which, as shown in Fig. 4, comprises an upper ply 13 of coated or rubberized fabric material fabricated in superposed relation with respect to a similar lower ply 14 and a plurality of tie threads 15 woven partially into each of the plies securing them together. These tie threads 15 are substantially inextensible and serve to determine the maximum extent of the separability or distension of the diaphragm 10 upon inflation. These tie threads 15, in conjunction with the fabric strip 16 which is secured to the edges of the upper and lower plies 13 and 14 throughout the entire periphery of the diaphragm 10, serve to determine the shape of the diaphragm. In order to insure the proper operation of the diaphragm 10, it is necessary that it be secured in place in the pocket 9 in which it is to function by means of a layer of suitable adhesive material 17 which is of such nature that it will resist attack from aromatic fuels.

At least one of the diaphragms 10, in this instance the one nearest the right-hand bulkhead 4 in Fig. 1, is arranged to be inflated from a suitable source of fluid under pressure (not shown). This is accomplished by a means for introducing fluid or inlet connection 18 extending through the bulkhead 4, the angle 12, the wall of the fuel cell 6, and the fabric strip 16 of the diaphragm in the manner shown in Fig. 2. The inlet connection 18 is provided with a flexible conduit 19 which connects it to the inflating equipment. It will be readily understood that the introduction of fluid under pressure to this one diaphragm 10 will serve to inflate the adjacent diaphragms through the connector tubes 11 substantially simultaneously therewith.

When the fuel cell 6 is filled with a supply of liquid fuel 20, the diaphragms 10 and their connector tubes 11 will be disposed in the relative positions illustrated in Fig. 3 of the drawings. As the liquid fuel is withdrawn from the fuel cell 6, the level will approach the top surfaces of the stiffener members 5. At some point immediately before this limit is approached, the inflating means will be operated to introduce fluid under pressure through the flexible connection 19 and the inlet connection 18 into the diaphragm 10 adjacent one end of the fuel cell 6.

This diahpragm is then inflated in the manner illustrated in Fig. 2 and, by reason of the connector tubes 11, a similar inflation of all of the adjacent diaphragms will take place at substantially the same instant. As a result of this operation, the several pockets 9 formed in the bottom wall 4 of the fuel cell 6 will become filled with the expanded diaphragms and, in effect, a new internal bottom wall of the fuel cell 6 will be formed by the several cooperating diaphragms 10 and those portions of the bottom wall of the fuel cell 6 which extend over the stiffener members 5 separating the several diaphragms. This operation will insure the displacement of any liquid fuel entrapped in the several pockets 9 and cause it to flow into the pocket 9 to which the outlet 8 is connected.

Another embodiment of the invention is illustrated in Figs. 5, 6, and 7 in which the inflatable member or diaphragm 21 takes the form of a generally tubular member fabricated from a flexible sheet material such, for example, as a rubberized fabric. The sheet material used in this form of structure, as well as that employed in the diaphragm 10, must be of such character that it will resist attack by the aromatic type liquid fuels customarily employed in aircraft and the like. One form of sheet material usable for this purpose is a cloth fabric coated with a rubberlike copolymer of butadiene and acrylonitrile.

The diaphragm 21 is fabricated from a sheet of the coated fabric the ends of which are lapped as at the joint 22 and similarly secured at the ends. By reason of the inherent tendency for such rubberized fabric structures to assume a generally cylindrical form upon inflation, it is essential that they be mounted securely in each of the several depressions or pockets 9 formed in the bottom wall of the flexible fuel cell 6. To this end, a continuous layer of adhesive 23 capable of resisting attack from aromatic fuel is applied to the entire floor and walls of each pocket 9 in the fuel cell 6 when the diaphragm 21 is inserted therein.

The several diaphragms 21 are adapted to be interconnected by means of the connector tubes 24. This arrangement enables all of the diaphragms 21 to be inflated substantially simultaneously with the one at the right, as seen in Fig. 5, which is directly connected with a suitable inflating means (not shown) as by means of the inlet connection 25 and the tube or hose 26.

As previously stated, the diaphragms 21, by reason of the lack of any internal restraint such as in the case of the double layer fabric from which the several diaphragms 10 are made, will tend to bow upwardly as shown in Fig. 5. This effect is not detrimental nor is it in any way detrimental to the displacement of the liquid from the individual pockets 9. The domed effect of the diaphragm 21, as will be seen from Fig. 6, creates at one end of the several diaphragms a trough 27 which traverses the several stiffener members 5 and insures drainage of all of the liquid fuel from the pockets 9 to the pocket associated with which the outlet 8 is connected.

The operation of the fuel cell 6 embodying the diaphragm 21 is identical with that previously described. Both forms of fuel cell are fundamentally concerned with the disposition of the inflatable member interiorly of the fuel cell. By virtue of this construction, all flexing of the pocketed bottom wall is avoided and the entire fuel supply will be drained from the cell.

While certain representative embodiments and details have been shown for the purpose of illustrating the invention, it will be apparent to those skilled in this art that various changes and modifications may be made therein without departing from the spirit or scope of the invention.

I claim:

1. A fuel cell for installation in a chamber in an airplane which is enclosed by rigid walls including stiffeners, said fuel cell comprising liquid-tight enclosure walls of a flexible sheet material which conform exactly to the internal outlines of the chamber, said flexible walls having depressions formed therein and defined by the stiffeners and enclosure walls of the chamber; an outlet in the cell; and a plurality of inflatable members disposed internally of the cell and confined in said depressions formed in the cell, said members operating upon inflation to fill these depressions substantially completely, preventing pocketing of the liquid and insuring complete drainage of the cell through the outlet.

2. A fuel cell for installation in a chamber in an airplane which is enclosed by rigid walls including stiffeners, said fuel cell comprising liquid-tight enclosure walls of a flexible sheet material which conform exactly to the internal outlines of the chamber, said flexible walls having depressions formed therein and defined by the stiffeners and enclosure walls of the chamber; an outlet in the cell; a plurality of inflatable members disposed internally of the cell and confined in said depressions formed in the cell, said members operating upon inflation to fill these depressions substantially completely, preventing pocketing of the liquid and insuring complete drainage of the cell through the outlet; and means interconnecting the several inflatable members whereby all are capable of simultaneous inflation.

3. A fuel cell for installation in a chamber in an airplane which is enclosed by rigid walls including stiffeners, said fuel cell comprising liquid-tight enclosure walls of a flexible sheet material which conform exactly to the internal outlines of the chamber, said flexible walls having depressions formed therein and defined by the stiffeners and enclosure walls of the chamber; an outlet in the cell; a plurality of inflatable fluid-tight diaphragms of flexible sheet material, said diaphragms being secured to the inner wall of the cell and confined in said depressions formed in the cell wall; and means on the diaphragms for introducing an inflating fluid to the diaphragms to cause them to expand and fill the depressions in which they are disposed substantially completely.

4. A fuel cell for installation in a chamber in an airplane which is enclosed by rigid walls including stiffeners, said fuel cell comprising liquid-tight enclosure walls of a flexible sheet material which conform exactly to the internal outlines of the chamber, said flexible walls having depressions formed therein and defined by the stiffeners and enclosure walls of the chamber; an outlet in the cell; a plurality of inflatable fluid-tight diaphragms of rubberized fabric material, said diaphragms being secured to the inner wall of the cell and confined in said depressions formed in the cell wall; means on the diaphragms for introducing an inflating fluid to the diaphragms to cause them to expand and fill the depressions in which they are disposed substantially completely; and means interconnecting the several diaphragms for substantially simultaneous inflation thereof.

5. A fuel cell for installation in a chamber in an airplane which is enclosed by rigid walls including stiffeners, said fuel cell comprising liquid-tight enclosure walls of a flexible sheet material which conform exactly to the internal outlines of the chamber, said flexible walls having depressions formed therein and defined by the stiffeners and enclosure walls of the chamber; an outlet in one of the depressions in the bottom wall of the cell; and a generally tubular inflatable member of fluid-tight rubberized fabric construction disposed internally of the cell and secured in place in each of the remaining depressions in the bottom wall thereof, all of said members being so constructed and arranged that upon inflation they will substantially completely fill the remaining depressions within the cell in which they are disposed and displace the liquid entrapped therein.

6. A fuel cell for installation in a chamber in an airplane which is enclosed by rigid walls including stiffeners, said fuel cell comprising liquid-tight enclosure walls of a flexible sheet material which conform exactly to the internal outlines of the chamber, said flexible walls having depressions formed therein and defined by the stiffeners and enclosure walls of the chamber; an outlet in one of the depressions in the bottom wall of the cell; a generally tubular inflatable member of fluid-tight rubberized fabric construction disposed internally of the cell and adhesively secured in place in each of the remaining depressions in the bottom wall thereof, all of said members being so constructed and arranged that upon inflation they will substantially completely fill the remaining depressions within the cell in which they are disposed and displace the liquid therefrom; and means on the inflatable members for introducing fluid under pressure to the inflatable members.

7. A fuel cell for installation in a chamber in an airplane which is enclosed by rigid walls including stiffeners, said fuel cell comprising liquid-tight enclosure walls of a flexible sheet material which conform exactly to the internal outlines of the chamber, said flexible walls having depressions formed therein and defined by the stiffeners and enclosure walls of the chamber; an outlet in one of the depressions in the bottom wall of the cell; a generally tubular inflatable member of fluid-tight rubberized fabric construction disposed internally of the cell and secured in place in each of the remaining depressions in the bottom wall thereof, all of said members being so constructed and arranged that upon inflation they will substantially completely fill the remaining depressions within the cell in which they are disposed and displace the liquid entrapped therein; means on the inflatable members for introducing fluid under pressure to the inflatable members; and means interconnecting the several inflatable members for substantially simultaneous inflation thereof by the introduction of fluid thereto.

8. A fuel cell for installation in a chamber in an airplane which is enclosed by rigid walls including stiffeners, said fuel cell comprising liquid-tight enclosure walls of a flexible sheet material which conform exactly to the internal outlines of the chamber, said flexible walls having depressions formed therein and defined by the stiffeners and enclosure walls of the chamber; an outlet in one of the depressions in the bottom wall of the cell; and an inflatable member disposed internally of the cell and secured in place in each of the remaining depressions in the bottom wall thereof, said inflatable member having a fluid-tight construction embodying a pair of superposed fabric plies joined together in separable relation by a plurality of substantially inextensible tie threads woven at least partially into each of the plies and a fabric strip sealing the edge of the fabric plies, said inflatable members being so constructed and arranged that upon inflation they will substantially completely fill the remaining depressions within the cell in which they are disposed and displace therefrom any liquid entrapped therein.

9. A fuel cell for installation in a chamber in an airplane which is enclosed by rigid walls including stiffeners, said fuel cell comprising liquid-tight enclosure walls of a flexible sheet material which conform exactly to the internal outlines of the chamber, said flexible walls having depressions formed therein and defined by the stiffeners and enclosure walls of the chamber; an outlet in one of the depressions in the bottom wall of the cell; an inflatable member disposed internally of the cell and secured in place in each of the remaining depressions in the bottom wall thereof, said inflatable member having a fluid-tight construction embodying a pair of superposed fabric plies joined together in separable relation by a plurality of substantially inextensible tie threads woven at least partially into each of the plies and a fabric strip sealing the edge of the fabric plies, said inflatable members being so constructed and arranged that upon inflation they will substantially completely fill the remaining depressions within the cell in which they are disposed and displace any liquid entrapped therein; and means on the inflatable members for introducing a fluid under pressure to the inflatable members.

10. A fuel cell for installation in a chamber in an airplane which is enclosed by rigid walls including stiffeners, said fuel cell comprising liquid-tight enclosure walls of a flexible sheet material which conform exactly to the internal outlines of the chamber, said flexible walls having depressions formed therein and defined by the stiffeners and enclosure walls of the chamber; an outlet in one of the depressions in the bottom wall of the cell; an inflatable member disposed internally of the cell and secured in place in each of the remaining depressions in the bottom wall thereof, said inflatable member having a fluid-tight construction embodying a pair of superposed fabric plies joined together in separable relation by a plurality of substantially inextensible tie threads woven at least partially into each of the plies and a fabric strip sealing the edge of the fabric plies, said inflatable members being so constructed and arranged that upon inflation they will substantially completely fill the remaining depressions within the cell in which they are disposed and displace any liquid entrapped therein; means on the inflatable members for introducing a fluid under pressure to the inflatable members; and means interconnecting the several inflatable members for substantially simultaneous inflation thereof.

JAMES A. MERRILL.

References Cited in the file of this patent

UNITED STATES PATENTS

| Number | Name | Date |
|---|---|---|
| 2,041,450 | Adams | May 19, 1936 |
| 2,519,393 | Noyes | Aug. 22, 1950 |